Aug. 29, 1961 L. FARNSWORTH 2,998,259
COLLET AND CHUCK THEREFOR
Filed May 23, 1960 2 Sheets-Sheet 1
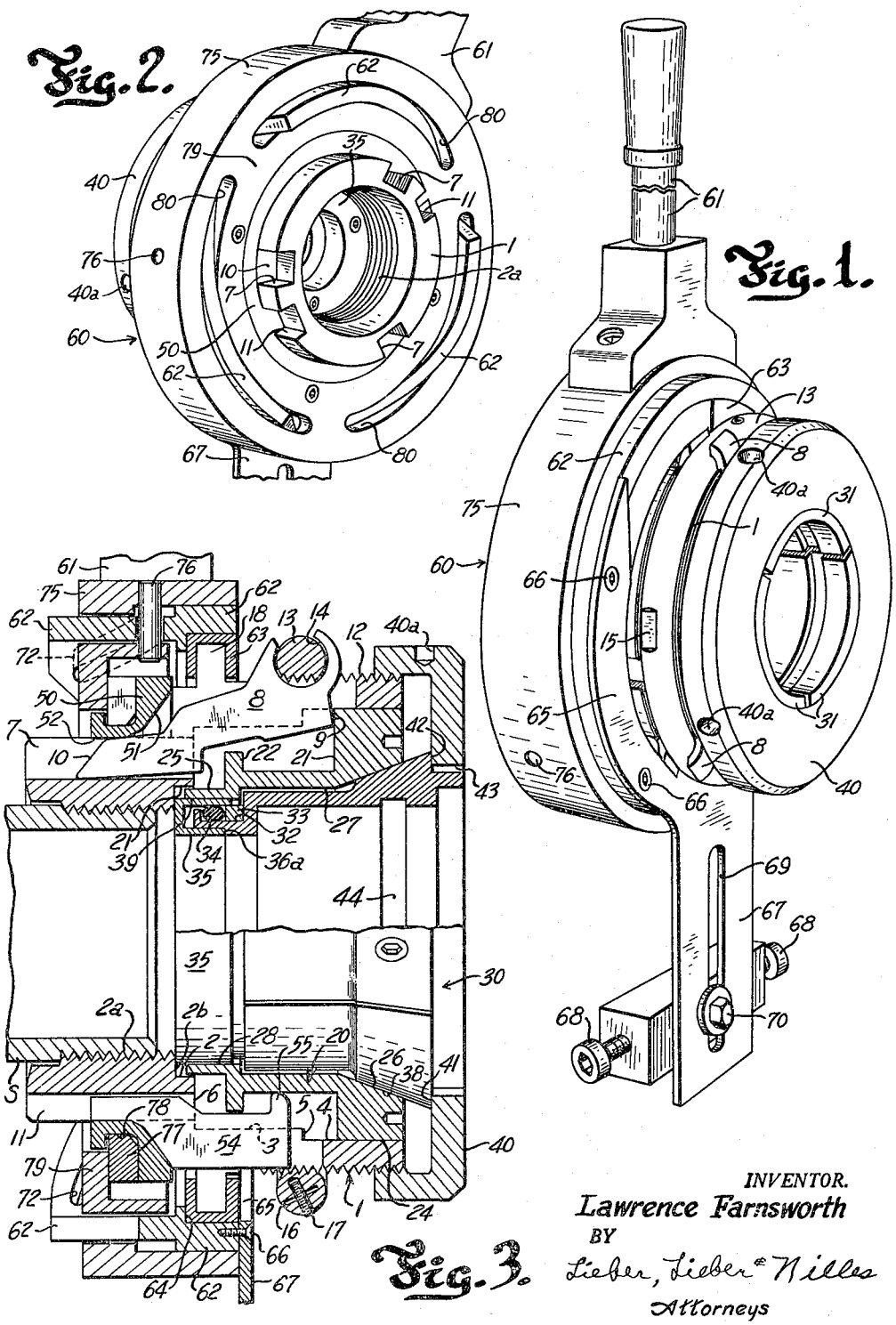
INVENTOR.
Lawrence Farnsworth
BY
Lieber, Lieber & Nilles
Attorneys Aug. 29, 1961 L. FARNSWORTH 2,998,259
COLLET AND CHUCK THEREFOR
Filed May 23, 1960 2 Sheets-Sheet 2
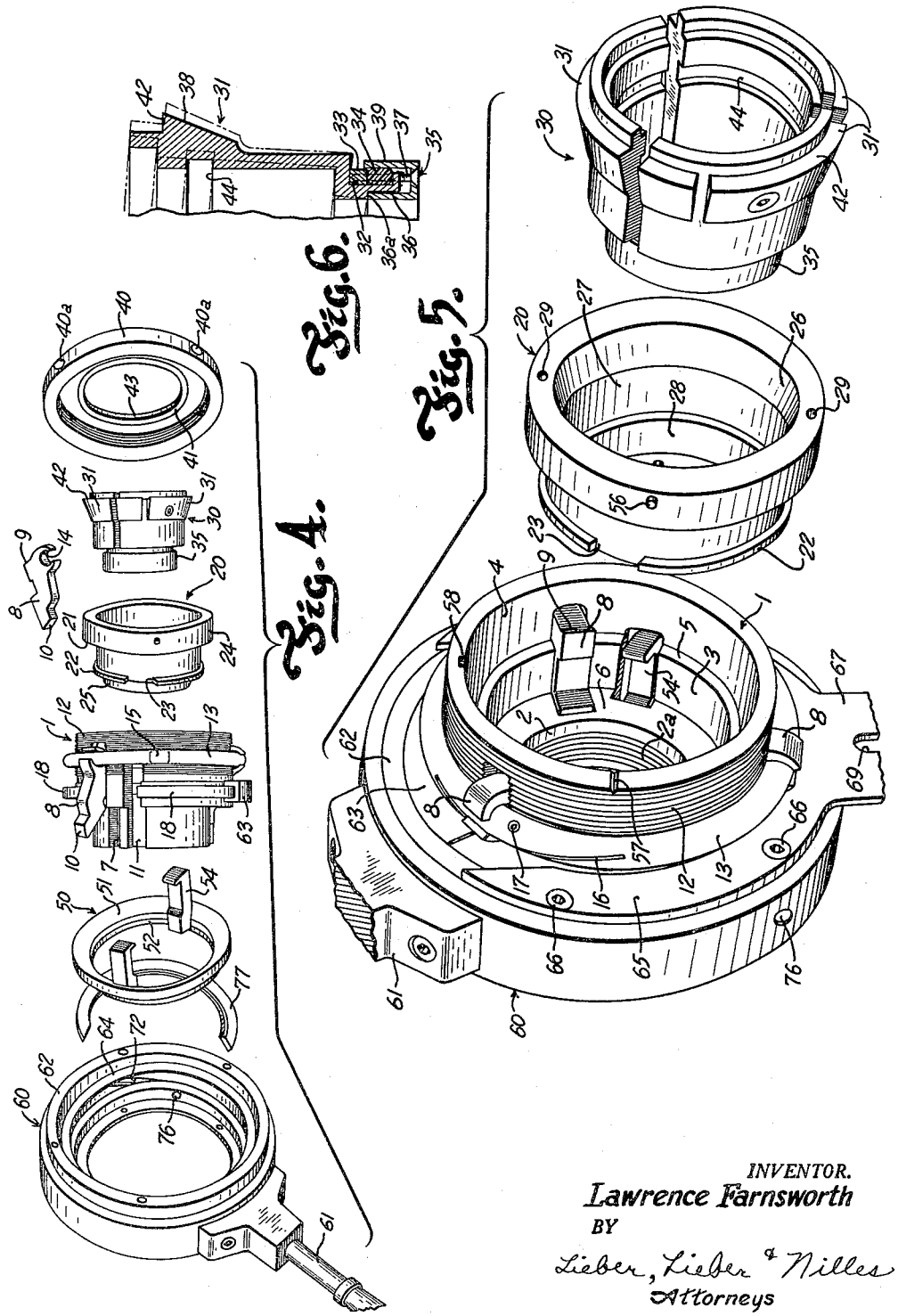
INVENTOR.
Lawrence Farnsworth
BY
Lieber, Lieber & Nilles
Attorneys

United States Patent Office 2,998,259
Patented Aug. 29, 1961

2,998,259
COLLET AND CHUCK THEREFOR
Lawrence Farnsworth, Racine, Wis., assignor, by direct and mesne assignments, to Heinrich Tools, Inc., Racine, Wis., a corporation of Wisconsin
Filed May 23, 1960, Ser. No. 30,923
8 Claims. (Cl. 279—50)

The present invention relates to collets and to collet chucks of the type which are adapted to grip or release a work-piece while the machine with which it is associated is rotating whereby it is unnecessary to stop the machine to load or unload the collet.

Conventional collet chucks utilize actuating bell-crank levers or dogs for axially shifting a sleeve closer relative to the tapered surface of the collet to thereby effect actuation of the collet, and in accordance with one aspect of the present invention, an improved collet chuck of this type has been provided, which is in the nature of an improvement over the subject matter of my copending United States application Serial Number 794,748, filed February 20, 1959, now U.S. Patent No. 2,994,538, issued August 1, 1961, and entitled "Collet Chuck Having An Axially Stationary Collet."

In collet chuck work of the type to which the present invention relates, it is extremely important to hold very close tolerances in the axial dimensions of the finished work-piece, for example, in the length of the piece or in the holes, counterbores or shoulders and the like which are formed on the work-piece.

It setting up the movable tool carriage to perform an operation on the work-piece held by the chuck, the travel of the tool relative to the collet is set for a definite operation. There may be a production run of one hundred pieces, in which pieces a certain axial bore depth is required to be held within a tolerance of less than a thousandth of an inch. There may also be a tolerance of two thousandths of an inch permitted on the diameter of these one hundred pieces, by which diameter the work-piece is grasped by the jaws of the collet. Because of this variation of diameter of these work-pieces, conventional collets of the axially shiftable type have been unable to hold each work-piece in an exact axial position relative to the cutting tool so as to insure a precise depth of bore in each work-piece. In other words, a variation in diameter of two thousandths of an inch between two work-pieces will result in a difference of as much as four thousandths of an inch in the axial position of these pieces in respect to the cutting tool. This is because the axially shiftable type collet occupies a different axial position, relative to the pre-determined stop setting of the tool, for different diameters of workpieces held thereby. While the variation in the axial position of these axially shiftable tapered collets is small, it nevertheless does limit the tolerances which can be held on axial dimensions of various work-pieces.

Even in conventional chucks which utilize axially stationary collets, problems have arisen in maintaining the required axial tolerance limits due to the axial thrust exerted on the spindle bearings when the operator actuates the collect closure mechanism to effect gripping of the work. This axial thrust is not only enough to cause variations in axial dimensions of the work, but also causes undue friction and consequent heating, wear and slipping problems.

It is accordingly an object of the present invention to provide an improved collet chuck which overcomes the above mentioned difficulties.

More specifically, the improved chuck of the present invention is an integral, axially compact, and self-contained chuck which can be readily removed from or attached to a conventional machine. The chuck may be removed from a machine on which a particular machining job has been set up, and then replaced on this machine to do the same job without requiring any additional set-up time and still maintaining the accuracy of work which was originally being held on the work.

Another aspect of the present invention provides an improved mounting means for the closer actuating levers, which means is readily adjustable to simultaneously shift all the levers in pressure increasing or decreasing directions to thereby vary the gripping action of the collet. This mounting means also provides a strong and rugged pivotal mounting for the levers to thereby eliminate prior problems due to shearing of the pivot pins. This mounting furthermore permits quick assembly or disassembly of the levers.

In accordance with another aspect of the present invention, an improved chuck has been provided which positively shifts the closer in both collet opening and closing directions. The collet itself, however, is held in an axially stationary position to insure precise axial positioning of the work-pieces.

Another and important object of this invention is to provide an improved collet which is axially short and compact, has three separate jaw sections and novel means for holding the sections in assembled and operable relationship, and which collect cannot wobble or cock when in use.

An improved collet and closer combination has also been provided which is axially compact, has good lateral stability, and provides positive opening as well as closing of the collet.

In the chuck made in accordance with the present invention, all of the axially forces required for axial shifting of the closer are maintained within the chuck itself and are not transmitted to the bearings of the spindles. As a result, any axial jarring or shifting is eliminated and extreme and consistent accuracy of work is assured.

These and other objects and advantages of the present invention will appear hereinafter as this disclosure progresses, reference being had to the drawings, in which:

FIGURE 1 is a perspective view of a collet chuck made in accordance with the present invention, the view being taken generally from the front end of the assembled chuck;

FIGURE 2 is a perspective view of the chuck shown in FIGURE 1, but on a slightly smaller scale, the view being taken generally from the rear or spindle end of the chuck;

FIGURE 3 is a vertical sectional view of the chuck shown in FIGURE 1, but on a slightly enlarged scale, the upper half of the figure being taken along an axial plane extending adjacent a collet closing lever, and the lower half of the figure being taken along an axial plane extending adjustment a collet opening lug, certain parts being broken away for clarity;

FIGURE 4 is a perspective view of certain of the parts of the chuck assembly in exploded relationship, certain parts being broken away or removed for clarity;

FIGURE 5 is another perspective view, on a scale enlarged from that of FIGURE 4, showing the chuck body assembled in the reaction member and oscillatable collar, and the closer and collet in exploded relationship thereto, and FIGURE 6 is a longitudinal sectional view through the collet.

*Body and adjustable actuating levers*

Referring in greater detail to the drawings, a generally cylindrical and hollow body 1 has an internally threaded portion 2a at its rear end by means of which the entire chuck assembly is removably secured to the spindle S (FIGURE 3) of the machine, such as for example, a lathe (not shown). The chuck assembly is entirely supported on the spindle and is removable therefrom as a complete unit simply by unthreading it from the spindle.

Referring to FIGURES 3 and 5, the inside of body 1 is formed by the smallest bore 2, intermediate bore 3 and largest bore 4. Bores 3 and 4 together define a radial shoulder 5 therebetween. Another shoulder 6 is formed at the juncture between bores 2 and 3. A third shoulder 2b is formed between bore 2 and threaded portion 2a. Thus, the body is of generally tubular shape and is in direct communication with the hollow spindle through which the work-piece stock (not shown) may be fed.

Circumferentially spaced around the outside of the body are three longitudinal slots 7 in each of which is located a bell-crank lever or dog 8. The slots 7 extend inwardly through a portion of the body so that the pressure applying edges 9 of the levers are located within the body. The rear end of each of the levers has an inclined or cam surface 10, for purposes that will appear.

Extending axially along a portion of the periphery of the body 1 is a threaded portion 12 on which is threadably engaged a mounting ring 13. This ring is shown as being generally round in cross section, although other cross sectional shapes may be used with the present invention. The actuating levers 8 are shiftably or swingably mounted on the ring by their C-shaped open slot 14 in their front end.

The ring has a flat area 15 which permits removal of the levers from the ring when the flat area has been rotated in axial alignment with the lever and the latter is then swung radially outwardly so that the flat area 15 of the ring can slip past the open end of the C-shaped slot 14.

Thus, the levers are held captive in rather loose swingable relationship on the ring and in their body slots 7.

In this manner, the ring 13 and its attached levers 8 are adjustable along the length of the body, and when moved toward the front of the chuck (to the right as viewed in FIGURES 3 and 5) the pressure transmitted by the edge 9 of the lever to the collet closer (to be described) is increased. Adjusting the position of the ring and levers in the opposite or rearward direction decreases the gripping pressure of the collet closer, as will appear more fully hereinafter.

Provision is made for locking the mounting ring 13 in its adjusted position. For this purpose the ring is slotted through a portion of its length, as at 16, and tightening of a set screw 17 extending through the ring in this slotted region causes the ring to securely bind in adjusted position on the body.

The body has an annular ridge 18 around its periphery and generally in the center of the axial length of the body. This ridge forms a mounting for the non-rotatable operating mechanism to be later referred to.

*Closer*

A generally cylindrical or sleeve-like collet closer 20 is axially shiftable within the body and is moved to the right (as viewed in FIGURE 3) to a collet closed position by the actuating levers 8. More particularly, the edges 9 of the levers 8 bear against the external radial shoulder 21 of the closure to forcibly shift the closure to the right.

Movement of the closer to the left (FIGURE 3) or rear causes the closer to permit the axially stationary collet (to be described) to open. This opening movement of the closer is positively accomplished, as will appear later, and insures quick and positive opening of the collet to immediately free the work-piece. For the purpose of providing a surface which may be grasped by the closer opening means (to be described), a smaller shoulder 22 is also formed on the periphery of the closer. Diametrically opposed opennigs 23 (FIGURE 5) are cut through shoulder 22 for purposes which will appear later.

The closer is very accurately guided for reciprocation in the body by means of the axially spaced and smoothly finished cylindrical bearing surfaces 24 and 25 which slide, respectively, on the body bores 4 and 2, and form a close fit therewith.

Spanner wrench holes 29 in the front side of the closer facilitate rotation of the closer in the body.

The interior of the closer 20 is formed by a tapered and smoothly finished, collet engaging surface 26, an intermediate bore 27, and a smoothly finished, smaller bore 28.

*Collet*

The collet 30 provided by the present invention is axially short, compact and is biased to the open position. The collet is formed of three similar, separate and segmental sections 31, in contrast to that type of collet formed from a single tubular piece having integral jaws formed by axial slits. When assembled, the three separate jaws 31 define a generally tubular body adapted to receive a work-piece.

As shown in FIGURE 6, the rear ends of the sections 31 define a reduced diameter which has a groove 32 formed in the periphery thereof. A full ring 33 is mounted in the groove 32 and acts to hold the sections in loosely assembled relationship. The ring 33 is inserted to the groove when the sections 31 are held tightly together so as to reduce their diameter, in other words, when the slots between the sections have been closed. The remainder of the groove 32 is filled with resilient material such as the neoprene 34 shown, or a spring if desired, and this resilient material acts to hold the jaws together and yet permits them to move slightly relative to one another. The rear ends of the sections are held together in assembled relationship by a U-shaped end cap 35 which fits tightly within the combined internal surfaces 36 of the sections and around the external surface of ring 33. The cap abuts against shoulder 36a and is securely held in place by three set screws 37 which extend through the bottom of the cap, between the sections, through the resilient material, and then threadably engage the steel ring 33. Tightening of these screws causes the resilient material 34 to be compressed, due to drawing of the ring toward the bottom of the cap. The dotted line position of one of the sections shows it moved to a more open position and it should be noted that the shoulder 36a always rests on the inside edge of cap 35.

The collet has an external tapered surface 38 on its front end which complements and is engageable by the tapered surface 26. As the closer is moved to the right, its tapered surface 26 bears tightly on surface 38 of the collet to close the jaws and effect the gripping action.

The collet is also supported in the closer at its rear end by means of the external and smooth surface 39 of the cap which snugly and slidably fits in the bore 28 of the closer. Thus, good lateral stability of the collet is assured and tipping or wobbling thereof is prevented.

A nose collar 40 is threaded on the front end of the body and has a pair of spanner wrench holes 40a for that purpose. Collar 40 has a smooth internal surface 41 against which the front shoulder 42 of the collet abuts to thereby prevent forward movement of the collet. The extreme front end of the collet protrudes through the central opening 43 in the nose collar. Rearward movement of the collet is prevented because the cap 35 bears tightly against shoulder 2b. Thus, the collet is axially fixed.

The particular internal shape of the collet shown is for use with soft jaw pads (not shown) such as disclosed in my copending United States application Serial No. 777,661, filed December 2, 1958, now U.S. Patent No. 2,994,539, issued August 1, 1961, and for that purpose an internal groove 44 is provided in the collet to receive a complementary shoulder on these soft jaw pads. The present invention, however, is not limited to use with such soft jaw pads, but is also usable in situations where the work-piece is gripped directly by the jaw sections 31.

It will be noted that the full diametrical capacity of the spindle S is available to accommodate the work-piece.

There are no collet adjusting tubes within the spindle and the collet is completely located, adjusted and actuated within the chuck itself.

Actuating ring

Means will now be described for forcibly swinging the actuating levers to consequently shift the closer to the collet closing position. This same means is used to positively shift the closer to the collet opening position.

This actuating means takes the form of a member or ring 50 which has an inclined cam surface 51 that bears against cam surface 10 of the levers, when the ring is urged to the right, thereby forcing the rear ends of levers radially inwardly, swinging the levers about their mounting ring 13, and forcing the lever edges 9 against the closer.

When the ring 50 has been moved fully to the collet closed position, the internal cylindrical surface 52 is located around the outside of the rear ends of levers 8, thus locking the latter in place. At this time the tapered surface 26 of the closer is bearing tightly against tapered surface 38 of the collet to cause gripping action of the collet jaws. The pressure of this gripping action has been determined by the axial position to which the mounting ring 13 has been adjusted.

The actuating ring 50 also includes a pair of diametrically opposed grasping means in the form of lugs 54 each of which have a projection or tooth 55 on its forward end. These lugs 54 may be formed integrally with the ring as a single casting and are axially slidable in the slots 11 of the body. The teeth 55 engage the shoulder 22 of the closer when the ring 50 is shifted to the left (in the collet opening direction) and thus forcibly and positively shift the closer to the collet open position thereby relieving pressure of the tapered jaws of the collet. As the ring 50 is moved to this open position, it slides off of levers 8 which are then free to pivot outwardly under influence of rearward movement of the closer.

When the closer is to be assembled in the body, the lugs 54 must be in their forward position. In addition, the diametrically opposed openings 23 must be in axial alignment with their respective lugs 54 to permit the lug teeth 55 to slip through the openings 23 and past the shoulder 22. As shown in FIGURE 5, when the locating pin 56 on the closer and a mark 57 on the front edge of the body are in alignment, then openings 23 are aligned with lugs 54. Thus, after the closer has been inserted in the body to a point when the pin 56 abuts against mark 57, then the closer is rotated, by a spanner wrench in holes 40a, until the pin 56 drops into the internal groove 58 in the body. The closer is then in its proper operating position within the body.

Operating mechanism

Mechanism 60 is provided for shifting the actuating ring 50 in one axial direction or another and this mechanism is non-rotatable and has been shown, for example, as being manually operated by handle 61. This mechanism includes an axially fixed and non-rotatable reaction member 62. A split bearing shoe 63 of U-shaped cross section embraces the annular ridge 18 of the rotatable body 1, and this bearing shoe is held captive between a shoulder 64 of the member 62 and an anchor yoke 65. Yoke 65 is in the nature of a Y-shaped plate which is secured by screws 66 to the front face of reaction member 62. Thus, the reaction member is stationarily mounted on the bronze bearing shoe 63 carried on the ridge 18 of the rotatable body.

The reaction member 62 is prevented from rotating by the lower end 67 of the anchor plate which abuts against any suitable stationary part (not shown) of the machine. For example, in the embodiment shown, the lower end 67 has adjustable set screws 68 which can be firmly engaged between the ways (not shown) of a lathe. Other means may of course be provided to prevent rotation of member 62, but the adjustable screws 68 together with the vertical adjustment provided by the slot 69 and bolt means 70, affords ease of adaptation to many standard machines.

The reaction member is also provided with three circumferentially spaced and transversely inclined cam tracks 72 extending therethrough.

An oscillatable collar 75 is mounted on the reaction member for limited oscillation between the collet closed position shown in FIGURES 2, 3 and 5, and the collet open position shown in FIGURE 1.

As shown in FIGURES 3 and 4, the collar 75 has three circumferentially spaced pins 76 carried therein which ride in their respective cam tracks 72.

Because of the camming connection between the stationary reaction member 62 and the oscillatable collar 75, oscillation of the collar in either direction causes the collar 75 and the actuating ring 50 rotatably mounted therein to be shifting axially in one direction or the other. A U-shaped bronze bearing shoe 77 (FIGURES 3 and 4) is slipped in the groove 78 formed exteriorly on the rear end of the actuating member 50. This shoe permits rotation between this rotating member 50 and a rear flange 79 of the non-rotatable and axially fixed reaction member 62.

In order to enhance axial compactness of the assembly, the collar 75 has three circumferentially spaced slots 80 extending through its radial flange 79, and through which slots the rear portions of the reaction member 62 can telescope.

Resume

The present chuck assembly is an integral and self-contained unit which can be completely adjusted and controlled from within the assembly itself. It is seldom necessary to disassemble the chuck, as foreign matter is excluded from this sealed unit.

The chuck body is carried by and rotatable with the spindle of the machine, and the entire chuck assembly can be easily attached to or detached as an integral unit from the machine by the thread connection of the body with the spindle and without disturbing the adjustment of any of its parts.

The operating mechanism provides a lever which is not swung in an axial direction and this is important to prevent axial thrust from being impohsed on the bearings. Instead, the operating lever is swung in a direction normal to the chuck axis and not only is exceptionally good actuating leverage obtained, but the body 1, closer 20, collet 30 and actuating ring 50 all rotate together as a unit, and all axial thrusts due to actuation of the chuck are absorbed between the bronze bearing shoes 63 and 77 and are not transmitted to the spindle bearings (not shown).

The actuating levers are all simultaneously adjustable in either axial direction to vary the gripping pressure of the collet. The mounting ring for these levers provides a rugged and shear-proof means for mounting the levers, which levers can be easily removed, if desired or necessary, for inspection or replacement.

Various modes of carrying out the invention are contemplated as being within the scope of the following claims particularly pointing out and distinctly claiming the subject matter which is regarded as the invention.

What is claimed and desired to be secured by Letters Patent is:

1. A collet chuck for use with a machine tool having a rotatably driven spindle including a free end, said chuck comprising a body adapted to be removably secured to said free end for rotation therewith, said body having a threaded portion, a mounting ring threadably engaged on said portion for axial adjustment therealong, actuating levers shiftably mounted on said ring, a collet closer reciprocal within said body between collet open and closed positions, said levers engageable with said closer to urge it so said collet closed position, an actuating ring engageable with said levers for shifting thereof, and means for axially shifting said actuating ring.

2. In a collet chuck for use with a machine tool having a rotatably driven spindle including a free end, a cylindrical body adapted to be removably secured to said free end for rotation therewith, said body having a part of its axial length constituting a threaded portion around its periphery, a mounting ring around said periphery and threadably engaged on said portion for being adjusted in an axial direction therealong, actuating levers having a portion embracing said ring and swingable thereon, a cylindrical closer axially slidable within said body between collet open and closed positions, said levers engageable with said closer to urge the latter to said collet closed position, and means for shifting said levers.

3. A collet chuck for use with a machine tool having a rotatably driven spindle including a free end, said chuck comprising a cylindrical body removably securable to said free end for rotation therewith in an axially fixed position, said body having a threaded portion on its periphery, a mounting ring threadably engaged on said portion for axial adjustment therealong, actuating levers pivotally mounted around said ring and axially adjustable therewith, a cylindrical closer axially shiftable within said body between collet open and closed positions, said levers engageable with said closer to shift it to said collet closed position, an actuating ring engageable with said levers for shifting thereof, and means for axially shifting said actuating ring.

4. A collet chuck assembly for use with a machine tool having a rotatably driven spindle including a free end, said assembly comprising a cylindrical body adapted to be removably secured to said free end for rotation therewith, said body having a threaded portion, a mounting ring threadably engaged on said portion for axial adjustment therealong, actuating levers shiftably mounted on said ring and axially adjustable therewith, a collet closer reciprocal within said body between collet open and closed positions, said levers engageable with said closer to urge it to said collet closed position, an actuating ring having a cam surface engageable with said levers for shifting the latter and thereby urging the closer to said collet closed position, said actuating ring also having grasping means for engagement with said closer to positively urge the latter to the collet open position, and means for axially shifting said actuating ring in either direction.

5. A collet chuck assembly for use with a machine tool having a rotatably driven spindle including a free end, said assembly comprising a cylindrical body adapted to be removably secured to said free end for rotation therewith, a non-rotatable reaction member in which said body is mounted whereby said member and body are axially fixed with said spindle, an oscillatable collar mounted on said reaction member and having a camming connection therewith whereby oscillation of said collar causes axial shifting of said collar, said body having a threaded portion, a mounting ring threadably engaged on said portion for axial adjustment therealong, actuating levers shiftably mounted on said ring, a cylindrical closer axially shiftable within said body between collet open and closed positions, said levers engageable with said closer to shift it to said collet closed position, and an actuating ring mounted in said collar and engageable with said levers for shifting the latter as said collar and actuating ring are shifted axially.

6. A collet chuck assembly for use with a machine tool having a rotatably driven spindle including a free end, said assembly comprising a cylindrical body adapted to be removably secured to said free end for rotation therewith, a non-rotatable reaction member in which said body is mounted whereby said member and body are axially fixed with said spindle, an oscillatable collar mounted on said reaction member and having a camming connection therewith whereby oscillation of said collar causes axial shifting of said collar in one direction or the other, said body having a threaded portion, a mounting ring threadably engaged on said portion for axial adjustment therealong, actuating levers shiftably mounted on said ring, a cylindrical closer axially shiftable within said body between collet open and closed positions, said levers engageable with said closer to shift it to said collet closed position, and an actuating ring mounted in said collar and having a cam surface engageable with said levers for shifting the latter and consequently the closer to the closed position as said collar and actuating ring are shifted axially in one direction, said actuating ring also having grasping means for engagement with said closer to positively shift the latter to the open position as said collar and actuating ring are shifted axially in the other direction.

7. A collet chuck for use with a machine tool having a rotatably driven spindle including a free end, said chuck comprising a body adapted to be removably secured to said free end for rotation therewith, actuating levers shiftably mounted on said body, a collet closer reciprocal within said body between collet open and closed positions, said levers engageable with said closer to urge it to said collet closed position, an actuating ring having a cam surface engageable with said levers for shifting the latter and thereby shifting the closer axially in one direction to said collet closed position, said actuating ring having grasping means for engagement with said closer to positively shift the latter axially in the other direction to the collet open position, and means on said chuck for axially shifting said actuating ring in either direction.

8. A collet chuck for use with a machine tool having a rotatably driven spindle including a free end, said chuck comprising a body removably securable to said free end for rotation therewith, a non-rotatable reaction member mounted on and supported by said body and in which the latter is rotatably mounted whereby said member and body are axially fixed with said spindle, an oscillatable collar mounted on said reaction member and having a camming connection therewith whereby oscillation of said collar causes axial shifting thereof, actuating levers shiftably mounted on said body, a collet closer reciprocal within said body between collet open and closed positions, said levers engageable with said closer to urge it to said collet closed position, and means carried by said collar and engageable with said levers for shifting thereof as said collar is axially shifted.

References Cited in the file of this patent

UNITED STATES PATENTS

| | | |
|---|---|---|
| 1,964,941 | Gustafson | July 3, 1934 |
| 2,277,275 | Swartz | Mar. 24, 1942 |
| 2,365,116 | Sloan | Dec. 12, 1944 |
| 2,586,478 | Paxhia | Feb. 19, 1952 |